United States Patent [19]

Walter

[11] Patent Number: 4,751,805
[45] Date of Patent: Jun. 21, 1988

[54] PACKING MACHINE

[75] Inventor: Kurt Walter, Glauburg, Fed. Rep. of Germany

[73] Assignee: Hassia Verpackungsmaschinen GmbH, Ranstadt, Fed. Rep. of Germany

[21] Appl. No.: 15,898

[22] Filed: Feb. 18, 1987

[30] Foreign Application Priority Data

Feb. 24, 1986 [DE] Fed. Rep. of Germany ....... 3605846

[51] Int. Cl.⁴ .............................................. B65B 63/00
[52] U.S. Cl. ...................................... 53/168; 53/559; 53/201; 53/266 R
[58] Field of Search ................. 53/168, 238, 239, 240, 53/249, 559, 561, 201; 53/266 R

[56] References Cited

U.S. PATENT DOCUMENTS

| | | | |
|---|---|---|---|
| 3,673,760 | 7/1972 | Canamero et al. | 53/559 X |
| 3,673,834 | 7/1972 | Brunner et al. | 53/559 X |
| 3,673,835 | 7/1972 | Arfert | 53/559 X |
| 3,805,486 | 4/1974 | Mahaffy et al. | 53/559 |
| 3,851,441 | 12/1974 | Marchand | 53/239 X |
| 4,554,777 | 11/1985 | Denk et al. | 53/201 |
| 4,630,426 | 12/1986 | Gentry | 53/559 X |

FOREIGN PATENT DOCUMENTS

| | | | |
|---|---|---|---|
| 2056370 | 5/1972 | Fed. Rep. of Germany | 53/559 |
| 2052551 | 6/1972 | Fed. Rep. of Germany | . |

Primary Examiner—Robert L. Spruill
Assistant Examiner—Steven P. Weihrouch
Attorney, Agent, or Firm—Collard, Roe & Galgano

[57] ABSTRACT

The packing machine comprising a passageway for continuous strip movement is intended for continuous and cyclical molding, filling, sealing and at least groupwise severing of containers, and comprises deep-drawing stations located along the path of continuous movement of the strip. In order to enable ordered product lots to be manufactured on such a machine, which lots contain different product components, for example, as regards filling quantities, types of product dressings and the like, the machine is configured such that the deep-drawing station (I) is furnished with a molding tool (1), that the molding tool (1) of the deep-drawing station (I) is provided with a variety of groups (2) of container shapes (4) of different volume, and that each group (2) of the molding tool, selectively and automatically, is formed, with the molding tool (1) to be adjustable into the deep-drawing position (3) relative to the continuously moving strip, that the filling station located behind the deep-drawing station (I) is formed of a variety of selectively operable loading stations (II) corresponding in number to the number of the groups (2), which loading stations are located in series above the path (5) of continuous movement, with the product feed-in lines (6) of the loading stations (II) leading to a corresponding number of product storage containers (7), and that the covering station (III) disposed behind the loading stations (II) is formed of a variety of selectively and automatically operable covering means (8) corresponding in number to the number of the groups (2).

7 Claims, 3 Drawing Sheets

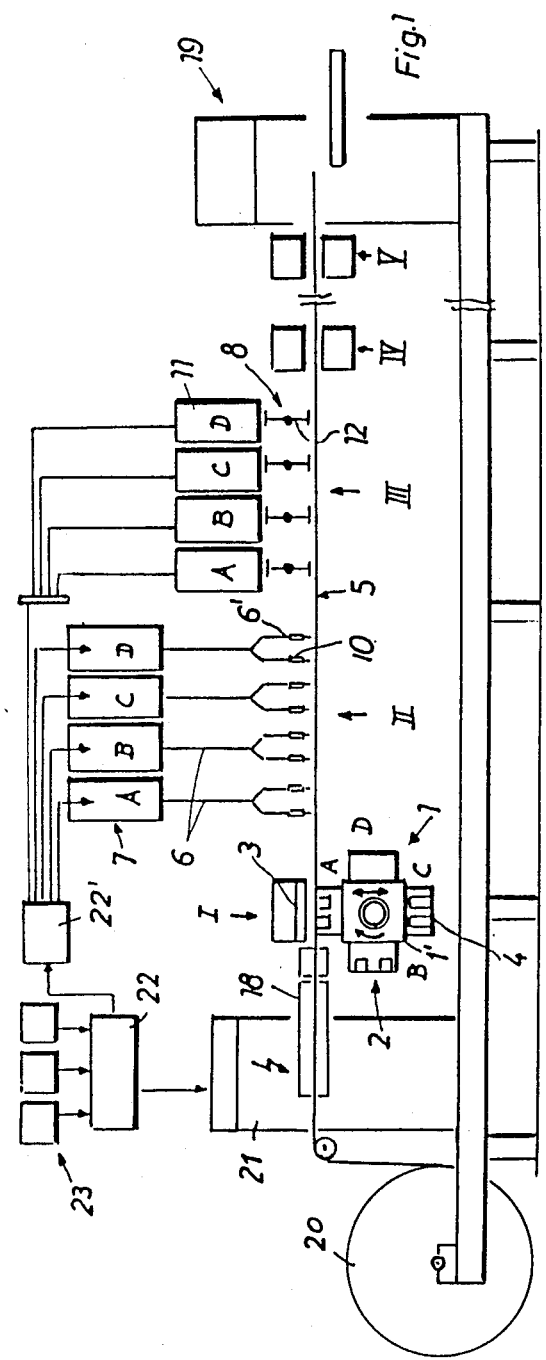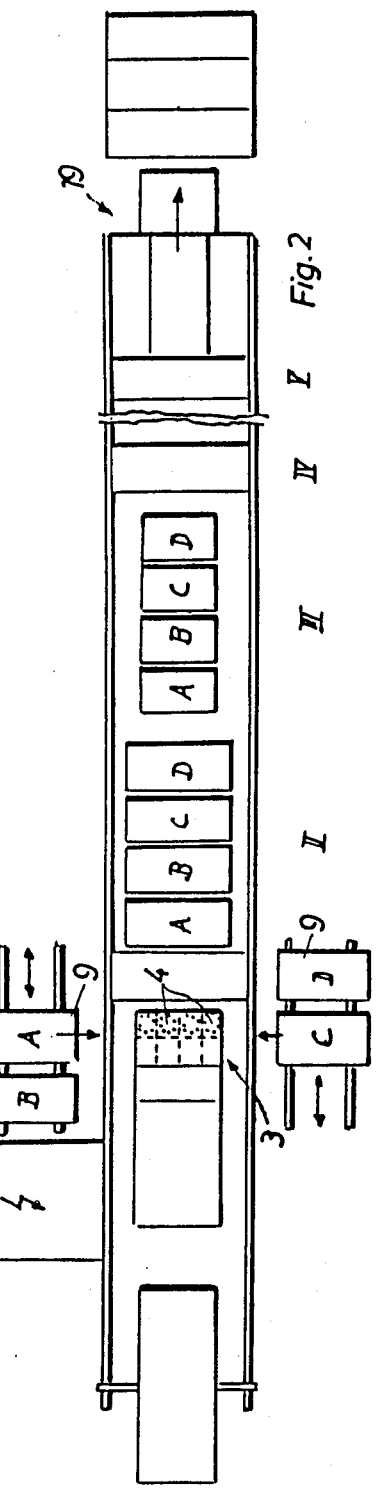

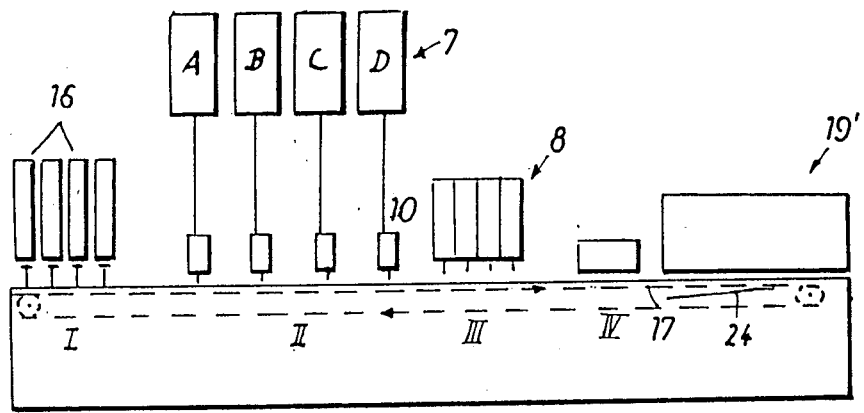
Fig.3
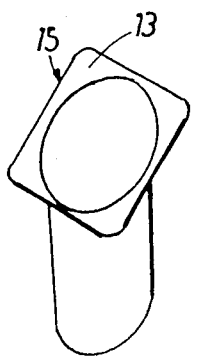
Fig.4
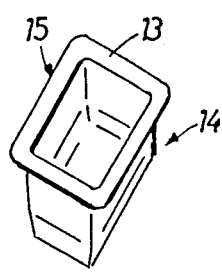
Fig.5
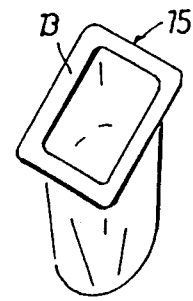
Fig.6
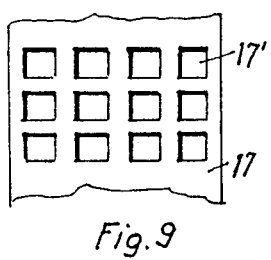
Fig.9
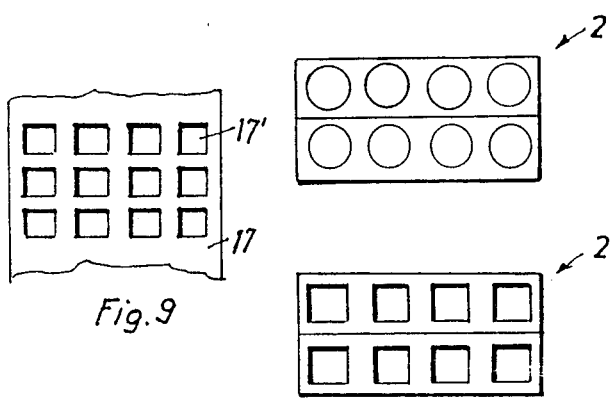
Fig.7
Fig.8

PACKING MACHINE

BACKGROUND OF THE INVENTION

1. Field of the Invention

The present invention is concerned with a packing machine comprising a continuously moving strip for continuously and cyclically molding, filling, sealing and at least group-wise separating of containers as set out in the preamble portion of the main claim.

2. Description of Prior Art

A packing machine of the afore-mentioned type is known, for example, from DE-A No. 20 52 551 exhibiting the characteristic feature of that the molding tool with the continuously moving strip is engaged over a predetermined distance to be subsequently restored. In such packing machines, a hot-deformable strip is caused, but suitable transport elements, to move throughout the machine, i.e. the containers, by deep-drawing, first are molded from the correspondingly pre-heated strip, loaded with the product, subsequently covered and finally sealed, whereupon the containers, individually or in coherent groups, are severed from the strip. This technique is common practice which, in principle, in unimprovable. The products, such as yoghurt, pudding, cream, juices and the like, as a rule, are to be processed in large quantities and, with respect to the containers, in hughe piece numbers which task can be readily coped with by conventional machines of this type.

However, the afore-described machines are capable only to process respectively one product only both as regards the type of product, the shape of container or the dressing and the respective quantity to be filled into the container. If a different product is to be processed, the packing machine must be correspondingly adapted to the afore-mentioned parameters. It is only then that the machine can be used for a different lot unless separate machines are provided for each individual product. Irrespective of the situation at the end of the product and packing manufacturer, the situation with the product marketing trade, under consideration of a broad range of offered products, as a rule, provides that dealers order product lots composed of different types of products of yoghurt and the like with, optionally, different quantities filled into the individual containers that may be of different sizes and shapes. These requirements placed upon by the trade can be complied with by the packing manufacturer and bottler (such as dairies) only by adequate cold storage facilities permitting ex factory composition and delivery of the called lots of different product components as there is no packing and bottling equipment available permitting immediate manufacture of the customer-specific lot with its individual product components. The whole of the manufacturing and delivery system hitherto employed, admittedly, is readily computerizable, which is practiced in the event of correspondingly large manufacturing and delivery volumes; however, it envolves correspondingly large investment requirements covering cold storage, listing of ordered lots and the like.

Moreover, a cold warehouse must more or less always be filled up with a range of most various product components in order to satisfy customer's requirements placed upon ordered lots of any desired combination. In addition, direct delivery of freshly packed products is precluded because, as previously mentioned, delivery can only be effected ex factory. Altering this system which—although largely rationalized is cost-intensive—substantially fails because the packing machines of the aforementioned type only permit on-stock processing because direct ex machine delivery of a lot will be possible only if the called lot covers a very specific product only.

SUMMARY OF THE INVENTION

In the practice of the invention, the packing machine is so constructed that the molding tool of the deep-drawing station is provided with a variety of groups of container shapes of different volumes and that each group of the molding tool, selectively and automatically, with the molding tool, in the deep-drawing position, is formed in a manner adjustable to the continuously moving strip, that the loading station disposed behind the deep-drawing station is formed of a variety of selectively operable loading stations corresponding in number to the number of the groups and disposed in series above the path of continuous movement, with the product feed-in lines of the loading stations fed to a corresponding number of products containers in store, and that the covering station disposed behind the loading stations is formed of a variety of selectively and automatically operable covering means corresponding in number to the number of groups.

The manufacturing efforts envolved with a so constructed packing machine, admittedly, are in excess of those envolved with a conventional packing machine; however, they are out of proportion to the efforts required by the afore-mentioned warehousing and delivering system, let alone the fact that such a machine permits delivery of the produced lot of different product components substantially directly after production thereof. The machine of the invention which, as regards the configuration of its individual stations thereof is based on constructions and structural elements customary in packing machine engineering, hence, is of substantial advantage and importance for the following warehousing and delivering system which, based on the inventive construction of the packing machine, can now be modified and substantially simplified, at the same time substantially reducing manufacturing costs.

To the extent that the dressing of the packages manufactured on a machine of this type not only relates to the covering and sealing strip, the packing machine can also be so constructed that in the area of the deep-drawing station, a variety of labelling machines corresponding in number to the number of the groups of container shapes is disposed next to the path of continuous passage, and that the said labelling means selectively are formed in a manner adjustable to the same deep-drawing position. To avoid by such an arrangement a corresponding enlargement of the packing machine, the labelling means are disposed on either side of the strip's path of continuous movement in a manner that the respective labelling or dressing means for the side wall of the containers can be adjusted into the fitting area. This will be explained in the following in greater detail. Apart from that, conventional labelling and banderoling machines may well be used.

Concerning the loading stations provided in corresponding numbers, admittedly, also conventional proportioning pumps may be employed. However, in order to preclude extended dwelling times of the products in the proportioning pumps, in the present instance, equally known but simpler loading systems are preferred in which the filling stations are formed through the ends of the product lines, with automatically operable loading valves being located in the said ends.

Substantially the same applies to the covering means to be provided in corresponding numbers and, in the present instance, preferably formed from covering strip storage shafts, with receiving and delivering elements for the covering strip blanks, respectively, to cover a complete container group being disposed between such shafts and the strip's continuous passageway.

According to another advantageous embodiment the group-wise different-volume container shapes of the molding tool relative to the sealing surface of each individual container and based on the container shape, are of identical configuration.

Concerning the molding tool in the deep-drawing station, the individual groups of container shapes, admittedly, could be composed of slides adjustable to the deep-drawing position; however, this would envolve substantial driving and guiding efforts. Moreover, in this connection, space problems would arise in cases where the machine were furnished with the afore-described dressing means which, as a rule, are, in fact, provided. For that reason, the packing machine, preferably, is so formed that the molding tool comprising at least two groups of container shapes, is in the form of a drum pivotable with respectively one group into the deep-drawing position and rotatably disposed in a manner movable up and down. Drums of this type or so-called quadruple-rotors, provided with container groups, are known from "Verpackungsrundschau" 11/1984, p. 1513, depict 6; however,the container shapes, in all groups, are of identical configuration. Moreover, the tool according to the citation is one intended to directly prepare individual containers from a strip continuously fed cyclically which, in the end position of the quadruple rotor, are ejected and stacked to be fed only thereafter, in stacked condition, to a corresponding loading machine. Under consideration of this equally known container prefabrication and subsequent loading of the containers introduced as ready-for-use containers into a corresponding packing machine, also the deep-drawing station can, of course, be replaced by a corresponding number of container magazines, with each container magazine accommodating a different type of containers having, for example, different volumes. In this variant, no strip moves through the machine; it is rather replaced by the containers admitted in an already shaped condition for which purpose the passageway for the continuous movement of the strip is in the form of a container carrying and conveying element. It is also in that type of construction and way of operation that the principle of the invention is to be realized in equivalent manner which, substantially, is distinguished from the afore-going in that the containers are not directly moulded into the strip moving through the machine but are rather admitted to the machine as ready-for-use containers.

The control of the packing machine does not require any closer explanatory statements, as a so constructed machine, equally, can readily be furnished with an electronic and correspondingly programmable control already employed with packing machines of the aforedescribed type. The prior art controls and programs only require modification to the effect that, depending on the control input, the correspondingly desired group of molding tool and the corresponding container supply shaft, respectively, and, as a consequence thereof, also the associated product storage containers and the respective loading station and, moreover, the respective covering means are placed into the operating position. Once a computer connection is established between manufacturer and customer, it can be readily taken into consideration that the buyer transfers his lot order with the different product components in correspondingly coded form directly to the packing machine computer thus ordering—optionally by additionally providing a storage—the direct supply from the packing machine.

OBJECTS OF THE INVENTION

It is, therefore, one object of the present invention to improve a packing machine of the afore-described type to the effect that different product components can be directly and successfully transported on a machine of this type.

According to another object of the invention, the machine is to be so constructed that a lot ordered from it which is to be of different product components, can be directly produced by it and hence, if desired, delivered directly in freshly filled condition.

A further object of the invention resides in providing labelling means to be selectively adjustable to the deep-drawing position.

It is still another object of the invention to so construct the molding tool that the same contains different container shapes combined in groups, wherein the groups with the molding tool are selectively adjustable to the deep-drawing position by a simple pivot movement.

Other objects, advantages and novel features of this invention will become manifest from the following detailed description in conjunction with the accompanying drawings.

BRIEF DESCRIPTION OF THE DRAWINGS

In the Figures,

FIG. 1, schematically, shows a side view of the packing machine;

FIG. 2 is a plan view of the packing machine according to FIG. 1;

FIG. 3 is a side view of the packing machine for the processing of ready-for-use containers;

FIGS. 4 to 8 show different embodiments of containers and groups of containers, respectively;

FIG. 9 is a fragmentary plan view of a transport element for the type of machine shown in FIG. 3.

DESCRIPTION OF PREFERRED EMBODIMENTS

Figure 10:
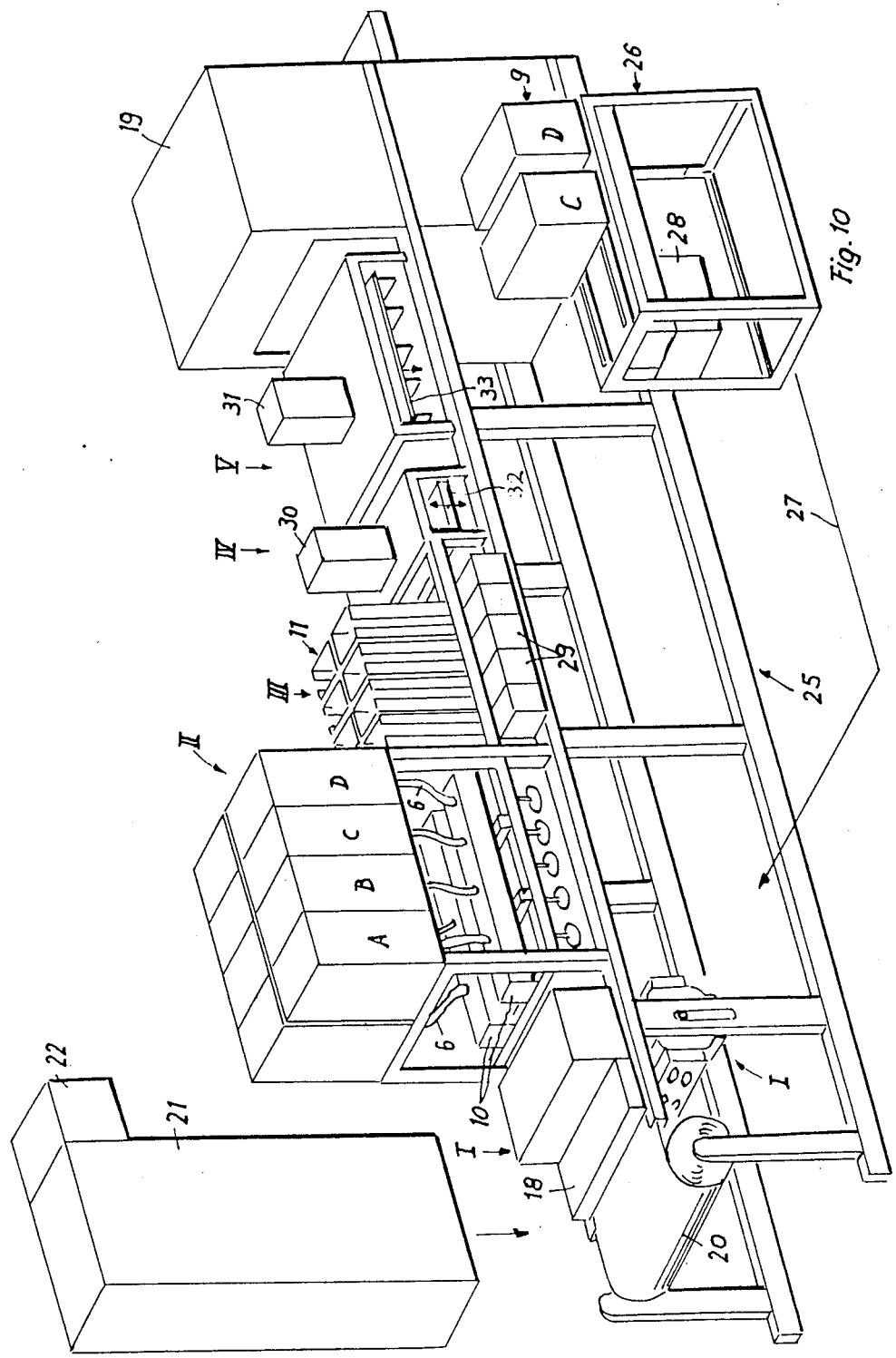
FIG. 10 is a perspective illustration of the machine according to FIG. 1.

As disclosed by FIGS. 1,2, the packing machine comprises deep-drawing, loading, covering, sealing and separating stations I–V disposed along path 5 of continuous movement of the strip. In the embodiment according to FIGS. 1,2, the deep-drawing station I is furnished with a molding tool 1 comprising a variety of groups 2 of container shapes 4 of different volumes which, selectively, can automatically be placed into the deep-drawing position 3. The molding tool 1 shown herein is provided with four groups 2 of container shapes and is in the form of a drum 1' capable to respectively pivot one group 2 into a deep-drawing position 3, and being rotatably disposed to be movable up and down. Within one group, the container shapes 4 respectively are of identical shape and configuration. For the continuous passage of a respective product component, the corresponding group 2 of container shapes remains in the deep-drawing position 3 and only through rotation of the molding tool 1 and drum 1', respectively, is replaced by another group 2.

In molding the containers in the deep-drawing station I, upstream of which the strip withdrawn from a dispenser reel 20 moves through a preheating station 18, the molding tool 1 moves up and down to release the molded containers for continued conveyance. Disposed downstream of the deep-drawing station I are a variety of selectively and automatically operable loading stations II corresponding in number to the number of the groups of shaped containers in series arrangement above the path 5 of continuous movement. The product feed-in lines 6 are connected to a corresponding number of product storage containers 7. As four groups 2 of shaped containers, are disposed on molding tool 1 in the illustrated embodiment, four product storage containers 7 are provided, with product fed-in lines 6 branching in the area of loading station II and in a group arrangement of the shaped containers as shown in FIGS. 7,8, with each of the eight ends 6' of the product feed-in lines 6 furnished with an automatically operable loading valve 10. Covering station III disposed downstream of loading station II equally is provided with four covering means 8 corresponding in number to the number of the groups of shaped containers, the covering means also being selectively and automatically operable. The covering means 8 respectively comprise one lid strip storage shaft 11, with conventional receiving and delivering elements 12 being provided between the latter and the path 5 for the continuous movement of the strip covering respectively one group of containers. The receiving and delivering elements 12 form cyclically rotatable four-armed structures at the ends of which are located suction cups. The covering station III is followed by the sealing station IV and, finally, by a separating station V in the form of a puncher separating the container groups 2 according to FIGS. 7 and 8 from the strip, and in which, moreover, are provided means furnishing the entire group of containers with severing aids to thereby facilitate breaking off or severing single or several containers from a group of containers. After leaving the punching station V by suitable conventional conveying elements (not shown), the groups of containers are moved onto a stacking mechanism 19 on which the complete lot can be stacked, accommodated on a pallet and, optionally, loaded immediately and transported away. In a stack of this type, based on the construction of the machine and depending on the scope of an ordered lot, groups of containers can be located thereon which may be continuously filled either with the same product or with two or three or different sorts of products and quantities.

If, as shown in the example, a product A is filled and packed, group A of drum 1' will, accordingly, be in the deep-drawing position 3. Storage container A with its respective loading valves 10 for that product A will be in operative condition; in covering station III, the same applies to cover strip storage shaft 11 equally designated by A. When changing over to product B, molding tool 1 is controlled accordingly, rotated by 90° in clockwise direction so that container group B is passed into the deep-drawing position 3 and then, after a corresponding delay, cover strip storage shaft 11 designated by B, will become effective. Forward and backward connections and, if need be, skips, will be readily possible and can be controlled by a suitable program; the same applies to the required delays in the operation of the storage containers 7 and the individual cover strip storage shafts 11 once a parameter change has been initiated.

Also, side wall decorations of containers may be suitably applied by correspondingly known labelling and decorating means 9 (FIG. 2); however, these must be available in corresponding numbers. As such wall decorations will have to be provided during deep-drawing of the containers, i.e. in the deep-drawing position 3, and as a series arrangement of such decorations means would result in an additional enlargement of the entire machine, such labelling means 9/ A–D are, as shown by FIG. 2, laterally disposed on either side of path 5 of continuous movement in displaceable relationship such that each of the four labelling means 9/A–D can be aligned with the deep-drawing position 3. In the embodiment as shown in FIG. 2, the labelling means 9 designated by A is in operative condition. In the event of a switch-over to product B, means 9/A along with means 9/B moves to the right thereby causing means 9/B to be in alignment with the deep-drawing position 3 to become operative. The same applies, mutatis mutandi, to means 9/C/D.

It would also be possible to subdivide sealing station IV and punching station V into four parts; however, this would involve extra efforts and a corresponding enlargement of the machine which would not appear to be justified in that the sealing areas of the package need not necessarily be taken into consideration in a change in parameters. Advantageously, the packing machine, in this respect, is so constructed that the container shapes 4 of different volume in groups 2 A–D of the molding tool 1, relative to the sealing surface 13 of each individual container 14 and to the cut-out shape 15 thereof, are of identical configuration. In this respect, reference is made to FIGS. 4 to 6. By maintaining shape and size of the sealing areas, which will be readily possible with any other change in parameters, the sealing and punching tools can be maintained in station IV and V after a change in parameters having been effected.

The packing machine schematically illustrated in FIG. 1 is more clearly shown in FIG. 10 as a more easily understandable perspective view. Identical elements are designated by identical numerals. The stand for the entire machine is designated by numeral 25 at and on which are disposed stations I–V, as described. The stand 26 for the labelling machines 9/C and D equally schematically illustrated, is, of course, provided—as indicated by arrow 27—adjacent the deep-drawing station which, on the other side thereof, is associated a corresponding stand. Drive 28 for the up-and-down movement and the pivot movement of the molding tool 1 is also located on stand 26. The loading valves 10 are shown as blocks to which product lines 6 lead. Numeral 29 designates the drives for the known covering means 8 (not shown) seated under the storage shafts 11 for the covering strip blanks, as shown in FIG. 1. The drive (e.g. pneumatic cylinder) for plate 32 movable up and down in the sealing station IV, is designated by numeral 30, whereas the one for the punching plate 33 in the separating station V is designated by 31.

As mentioned in the afore-going and as readily apparent from the afore-going description, it is not absolutely necessary for the package formation to have a hot-deformable strip pass through the machine; this principle may rather also be readily employed with ready-foruse containers which, optionally, may already be pre-decorated. For this purpose, it will only be necessary for the deep-drawing station I to be replaced by a corresponding number of magazines 16 stacking ready-for-use containers, and for the strip passage to be replaced by a circumferential and endless container carrying and conveying element 17, as highly schematically shown in FIGS. 3 and 9. To the extent that the ready-for-use containers are already pre-decorated, a labelling means 9 can, of course, be eliminated. The ready-for-use containers, equally, can be delivered in groups, as shown in FIGS. 7,8 and then be loaded in group; a punching station V would be necessary only if a group of single containers were covered by a covering strip embracing all containers. As in that instance, individual containers will be delivered at the end of path 5 of continuous conveyance, stacking means 19, of FIG. 1, is replaced by a packer 19′ suitable for packing individual containers and first introducing the said individual containers into suitable cardboard boxes which are then again stacked to form a pile. A leading slope 24 at the end of the conveying element 17 cyclically driven circumferentially, of which only a partial section with receiving ports 17′ conforming to the respective container shape is shown in FIG. 9, will lift the filled and covered containers off the conveying element 17 to enable same to be passed into packer 19′.

The control cabinet of the machine is designated by numeral 21. Unit 22 represents a central computer providing the corresponding commands to the control cabinet 21 but also to the individual storage containers 7/A–D with the loading valves 10, and the cover strip supply shafts 11/A–D and, if used, to the labelling means 9/A–D. Unit 23 constitutes, for example, customer and order computers that can be in telecommunication with the central computer 22 to enable lot orders to be put directly into the central computer 22.

It will thus be seen that the objects set forth above and those made apparent from the preceding description, are efficiently attained while some changes may be made in the above construction without departing from the spirit and scope of the invention; it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to be encompassed thereby.

What is claimed is:

1. A packing machine defining a path for the continuous passage of a strip and adapted for the cyclical molding of the strip into containers, loading the molded containers, sealing the loaded containers and separating the loaded containers into groups including at least one container, which comprises
   (a) a dispensing roll for the strip upstream of the path,
   (b) a deep-drawing station receiving the strip dispensed from the roll, the deep-drawing station comprising
      (1) a molding tool equipped with a plurality of groups of container shapes of different volume, the container shapes of each group being arranged adjacent to each other and sequentially along said path, and each group of container shapes being selectively and automatically adjustable into a molding position with respect to the strip,
   (c) a loading stage downstream of the deep-drawing station along said path, the loading stage comprising
      (1) a plurality of tanks corresponding in number to the groups of container shapes, the tanks storing a product to be loaded into the containers,
      (2) a plurality of selectivity and automatically operable loading stations corresponding in number to the groups of container shapes, the loading stations being arranged adjacent to each other and sequentially along said path, and
      (3) respective feed-in lines leading from respective ones of the tanks to respective ones of the loading stations for feeding the product thereto,
   (d) a container covering station downstream of the loading stage along said path, the covering station comprising
      (1) a plurality of selectively and automatically operable means for applying covers to the containers, the container covering means corresponding in number to the groups of container shapes,
   (e) a sealing station downstream of the container covering station for sealing the applied covers to the containers, and
   (f) a separating station for separating the loaded, covered and sealed containers into said groups.

2. The packing machine of claim 1, further comprising a plurality of decorating means corresponding in number to the groups of container shapes, the decorating means being arranged adjacent the deep-drawing station laterally of said path and being adjustable into alignment with the molding position.

3. The packing machine of claim 1, wherein the loading stations are constituted by ends of the feed-in lines and automatically operable loading valves mounted in said ends.

4. The packing machine of claim 1, wherein each of the container covering means comprises a plurality of shafts corresponding in number to the container shapes and holding a stack of said covers, and a plurality of cover receiving and delivering elements corresponding in number to the container shapes and arranged between the shafts and said path for applying the covers received from the shafts to the containers.

5. The packing machine of claim 1, wherein the molding tool is shaped to mold the container shapes of all the groups with sealing faces of identical configuration for sealing the covers thereto, the sealing faces defining cut-outs of identical configuration.

6. The packing machine of claim 1, wherein the molding tool comprises a drum carrying at least two of said groups of container shapes, the drum being vertically reciprocable into and out of the molding position and being rotatable for alignment of a respective one of said groups of container shapes with said strip.

7. A packing machine defining a path for the conveyance of a sequence of a plurality of groups of containers having shapes of different volume and adapted for the cyclical loading of the containers, sealing the loaded containers and separating the loaded containers into groups including at least one container, which comprises
   (a) a plurality of storage magazines corresponding in number to the groups of containers of different volume upstream of the path, (b) a plurality of groups of container carrying and conveying elements corresponding in number to the groups of containers arranged in said path, (c) a loading stage downstream of the storage magazines along said path, the loading stage comprising (1) a plurality of tanks corresponding in number to the groups of container shapes, the tanks storing a product to be loaded into the containers, (2) a plurality of selectively and automatically operable loading stations corresponding in number to the groups of container shapes, the loading stations being arranged adjacent to each other and sequentially along said path, and (3) respective feed-in lines leading from respective ones of the tanks to respective ones of the loading stations for feeding the product thereto, (d) a container covering station downstream of the loading stage along said path, the covering station comprising (1) a plurality of selectively and automatically operable means for applying covers to the containers, the container covering means corresponding in number to the groups of container shapes.

(e) a sealing station downstream of the container covering station for sealing the applied covers to the containers, and (f) a separating station for separating the loaded, covered and sealed containers into said groups.

* * * * *